(12) United States Patent
Lemaire

(10) Patent No.: US 11,796,682 B2
(45) Date of Patent: Oct. 24, 2023

(54) METHODS FOR GEOSPATIAL POSITIONING AND PORTABLE POSITIONING DEVICES THEREOF

(71) Applicant: Trimble Nantes S.A.S., Carquefoux (FR)

(72) Inventor: Charles Lemaire, Carquefoux (FR)

(73) Assignee: Trimble Nantes S.A.S., Carquefoux (FR)

( * ) Notice: Subject to any disclaimer, the term of this patent is extended or adjusted under 35 U.S.C. 154(b) by 0 days.

(21) Appl. No.: 18/117,131

(22) Filed: Mar. 3, 2023

(65) Prior Publication Data

US 2023/0243979 A1    Aug. 3, 2023

Related U.S. Application Data

(63) Continuation of application No. 16/450,412, filed on Jun. 24, 2019, now Pat. No. 11,614,546.

(30) Foreign Application Priority Data

Jul. 20, 2018 (EP) .................................. 8290086

(51) Int. Cl.
*G01S 19/47* (2010.01)
*G01S 19/14* (2010.01)
(Continued)

(52) U.S. Cl.
CPC .......... *G01S 19/14* (2013.01); *G01C 21/1656* (2020.08); *G01S 5/0027* (2013.01);
(Continued)

(58) Field of Classification Search
CPC ...... G01S 19/14; G01S 19/485; G01S 5/0027; G01S 19/47; G01S 19/49; G01C 21/1656; G06V 20/20; G06F 18/25
See application file for complete search history.

(56) References Cited

U.S. PATENT DOCUMENTS 11,614,546 B2    3/2023 Lemaire et al.
2009/0262974 A1   10/2009 Lithopoulos
(Continued)

OTHER PUBLICATIONS

"Polar X6 Dual-Frequency Handheld Receiver", South Surveying & Mapping Instrument Co., Ltd.; South Target your success, 2 pages.
(Continued)

*Primary Examiner* — Mathew Franklin Gordon
(74) *Attorney, Agent, or Firm* — KILPATRICK TOWNSEND & STOCKTON LLP

(57) ABSTRACT

Embodiments provide for a method of determining a geospatial position of a point of interest and a portable positioning device. In one embodiment, the method includes collecting data from a receiving unit and data from at least one of an imaging device and an IMU of the positioning device for each one of a plurality of positions of the positioning device. The collected data is then transmitted to a data fusing processor for determining orientations and positions of the positioning device for the plurality of positions in a global coordinate system. Further, the method includes obtaining a pointing input including a sighting direction towards the point of interest from the positioning device being positioned at at least one reference position. The pointing input is transmitted to the data fusing processor for identifying the point of interest and for determining the geospatial position of the point of interest in the global coordinate system.

20 Claims, 7 Drawing Sheets

(51) Int. Cl.
  *G01S 5/00* (2006.01)
  *G06V 20/20* (2022.01)
  *G01S 19/48* (2010.01)
  *G01S 19/49* (2010.01)
  *G01C 21/16* (2006.01)
  *G06F 18/25* (2023.01)

(52) U.S. Cl.
  CPC ............ *G01S 19/47* (2013.01); *G01S 19/485* (2020.05); *G01S 19/49* (2013.01); *G06F 18/25* (2023.01); *G06V 20/20* (2022.01)

(56) References Cited

U.S. PATENT DOCUMENTS

| | | |
|---|---|---|
| 2013/0223691 A1 | 8/2013 | Paczkowski et al. |
| 2018/0017384 A1 | 1/2018 | Siercks et al. |
| 2018/0180416 A1 | 6/2018 | Edelman et al. |
| 2018/0321031 A1 | 11/2018 | Baskin et al. |

OTHER PUBLICATIONS

Extended European Search Report for Application No. 18290086.0, dated Jan. 23, 2019, 9 pages.
U.S. Appl. No. 16/450,412 Non-Final Office Action dated Sep. 24, 2021, 11 pages.
U.S. Appl. No. 16/450,412 Final Office Action dated Jan. 19, 2022, 12 pages.
U.S. Appl. No. 16/450,412 Notice of Allowance dated Nov. 23, 2022, 7 pages.

METHODS FOR GEOSPATIAL POSITIONING AND PORTABLE POSITIONING DEVICES THEREOF

CROSS-REFERENCE TO RELATED APPLICATIONS

The present application is a Continuation of U.S. application Ser. No. 16/450,412, filed Jun. 24, 2019, which claims priority to EPC Application No. 18290086.0, filed Jul. 20, 2018, the contents of which are incorporated herein by reference in their entirety for all purposes.

TECHNICAL FIELD

The present disclosure relates generally to the field of positioning and more particularly to methods for geospatial positioning and portable positioning devices adapted to obtain a geospatial position of a point of interest. Methods and positioning devices disclosed herein may provide a three-dimensional geospatial position of the point of interest.

BACKGROUND

Positioning relates to the art of determining the position of a person, object or system on, or near, the surface of the Earth, i.e. the art of determining the coordinates of a location (latitude, longitude and altitude). Positioning may be of interest in, for example, the technical field of surveying whose purpose is to e.g. establish land maps based on the determination of terrestrial or three-dimensional position of points using the relative distances and angles between these points. In such an application, the resulting land map will be dependent on the absolute position of the surveying system, a component of the surveying system or a surveyed object, as may be determined by a positioning device using signals received from a global navigation satellite system (GNSS).

The position of a terrain point may for example be obtained by means of a survey pole equipped with a pointing tip to place the survey pole at the terrain point of interest and with a GNSS antenna having a so-called "phase center" at which satellite information signals are received. The survey pole may also be equipped with a tilt sensor to level the survey pole so that it is ensured that the phase center of the antenna is vertical over the terrain point. Levelling the pole may however take time and/or be imprecise. Further, as the satellite information signals are received at the phase center of the GNSS antenna, compensation for the length of the pole is necessary in order to compute the three-dimensional position of the terrain point.

Such survey poles are commonly used in surveying applications. However, for such applications and also others, there is still a need of providing new and improved positioning devices. In particular, there is a need of providing more compact positioning devices.

SUMMARY

It is therefore an object of the present invention to overcome at least some of the above mentioned drawbacks, and to provide an improved method and/or an improved positioning device for obtaining a geospatial position of a point of interest.

This and other objects are achieved by means of a method and a positioning device as defined in the appended independent claims. Other embodiments are defined by the dependent claims.

According to some embodiments of the present disclosure, there is provided a method for determining a geospatial position of a point of interest. The method may include collecting, by a data collector of a positioning device, data from a global navigation satellite system (GNSS) receiving unit and data from at least one of an imaging device and an inertial measurement unit (IMU) of the positioning device for a plurality of positions of the positioning device in the vicinity of the point of interest. Further, the method may include transmitting the collected data to a data fusing processor for determining orientations and positions of the positioning device for the plurality of positions of the positioning device in a global coordinate system. The method may then include obtaining, by the data collector, a pointing input indicative of a position of the point of interest relative to the positioning device for at least one reference position of the positioning device. The pointing input may then be transmitted to the data fusing processor for identifying the point of interest and for determining the geospatial position of the point of interest in the global coordinate system based on the determined orientations and positions of the positioning device in the global coordinate system.

According to some embodiments of the present disclosure, a portable positioning device adapted to obtain a geospatial position of a point of interest is provided. The portable positioning device comprises a global navigation satellite system (GNSS) receiving unit including an antenna adapted to receive satellite information signals from a GNSS. The positioning device may further comprise either one, or both of, an imaging device and an inertial measurement unit (IMU).

The imaging device may be adapted to capture a series of images, or a video, of a scene including the point of interest. The IMU may be adapted to provide acceleration and gyroscopic data (for the positioning device).

The positioning device further includes a data collector adapted to collect data from the GNSS receiving unit and data from the imaging device and/or the IMU for a plurality of positions of the positioning device in the vicinity of the point of interest. The data collector is further configured to obtain a pointing input indicative of a position of the point of interest relative to the positioning device for at least one reference position of the positioning device.

The positioning device may further include a transmitter for transmitting the collected data and the pointing input to a data fusing processor for determining orientations and positions of the positioning device for the plurality of positions of the positioning device in a global coordinate system, identifying the point of interest and determining the geospatial position of the point of interest in the global coordinate system based on the determined orientations and positions of the positioning device and the pointing input.

In some embodiments, the data fusing processor may be an integrated part of the positioning device while, in other embodiments, the data fusing processor may be arranged at a remote device or a remote sever, for example located within an internet cloud infrastructure.

The embodiments of the present disclosure rely on two main steps. In a first main step, the absolute orientations and positions of the positioning device, i.e. the orientations and positions of the positioning device in the global coordinate system, are determined for a number of locations of the positioning device in the vicinity of the point of interest. For this first main step, data may be collected from a number of detectors of the positioning device for determining the orientation and the position of the positioning device for each one of a plurality of positions of the positioning device.

During this step, data is collected for determining orientations and positions of the positioning device in the surrounding of the point of interest (or over a surface including the point of interest).

For example, the data may be collected during a limited time period, or within a certain time interval, during which the operator holds the positioning device over, or in the vicinity of, the surface including the point of interest (i.e. in the surrounding of the point of interest), such that the data for determining the orientations and positions of the positioning device in the vicinity of the point of interest are collected for different locations of the positioning device. In one scenario, the operator may walk over a surface including the point of interest while holding the positioning device such that the positioning device records data at different locations.

As will be further explained in the following, according to one alternative, data for determining the orientations and positions of the positioning device for a plurality of positions (or locations) of the positioning device may be collected from the GNSS receiving unit and the imaging device. According to another alternative, data may be collected from the GNSS receiving unit and the IMU. According to yet another alternative, data may be collected from the GNSS receiving unit, the imaging device and the IMU, i.e. all three detectors. The collected data may therefore be GNSS/IMU data, GNSS/imaging device data or GNSS/IMU/imaging device data.

The data fusing processor receiving the collected data may be adapted to fuse all data in order to determine the orientation and the position of the positioning device for each one of the plurality of locations at which the data is collected. The data fusing processor may be in communication with one or more transmitters of the positioning device at which the collected data is obtained. The transmitter may for example be part of the data collector. It may also be envisaged that the data fusing processor is in direct communication with each one of the GNSS receiving unit, the imaging device and the IMU.

In a second main step, the positioning device is placed at a reference position (or reference location) and the point of interest is sighted from the reference position. A pointing input is obtained from the reference location in order to identify the point of interest. The reference location does not need to correspond to one of the locations for which the orientations and positions of the positioning device have been determined. The position and the orientation of the positioning device at the reference location may be determined based on the positions and orientations determined at other locations. It will be appreciated that the position and the orientation of the positioning device at the reference location may not be known at the time when the pointing input is acquired and may thus be subsequently determined. The reference location is just a location from which the pointing input is collected. The reference location may also be referred to as a measurement location, which is used for identifying the point of interest.

It will be appreciated that the first main step and the second main step may be performed in opposite order or concurrently, i.e. with the acquisition of the pointing input prior to the determination of the orientations and positions at the plurality of locations, or while the orientations and positions of the positioning device at the plurality of locations are being determined.

The pointing input may indicate the position of the point of interest relative to the positioning device. The pointing input may for example include a sighting direction towards the point of interest from (or with) the positioning device being positioned at the (or at least one) reference location.

As it is possible to know the position and orientation of the positioning device at the reference location based on the orientations and positions of the positioning device determined during the first main step (i.e. based on the data collected by the GNSS, the IMU and/or the imaging device), it is then possible to determine the geospatial position of the point of interest based on the pointing input.

The present method relies on the use of a GNSS receiving unit and either one of an imaging device or an IMU for determining the geospatial position of a point of interest and has the benefit of not requiring any levelling procedure. A new kind of positioning devices is provided with which horizontal levelling is not necessary. The present method does not either necessitate a pole with a pointing tip, which usually is heavy and cumbersome. As such, the method may be implemented in a positioning device which is lighter and more compact. The method for determining the geospatial position of a point of interest and the positioning device thereof present the benefit of being contactless in the sense that a physical contact between the positioning device and the point of interest is not necessary. Further, the positioning device may be portable and, in particular, may be handheld like a smartphone or the like.

The accuracy of the determined geospatial position may depend on different factors among which the accuracy of the GNSS board (or GNSS receiver). However, using a GNSS board with a centimeter-level precision, a geospatial position with a centimeter accuracy can be obtained. Other factors affecting the accuracy of the geospatial position computed by the data fusing processor may for example include the mechanical tolerances in the arrangement of the GNSS antenna relative to the imaging device and/or the IMU. A calibration procedure may be performed to calibrate the positioning device and thereby compensate for, or at least reduce, the effect of these variations. Each positioning device may have its own calibration model.

Further, it will be appreciated that the satellite information signals are received at a phase center of the GNSS antenna. To improve the accuracy of the measurement, the GNSS antenna may be arranged to be positioned horizontally while capturing images of the scene. For this purpose, the positioning device may, in some embodiments, be equipped with a stabilization device to maintain the GNSS antenna in a horizontal position.

Different techniques may be employed to identify the target (or point of interest) for which the 3D position in the GNSS is to be determined.

According to an embodiment, the pointing input may include a sighting direction from the positioning device towards the point of interest and a distance from the positioning device to the point of interest. For example, the positioning device may be equipped with a pointing device adapted to measure a distance to the point of interest. The pointing device may provide or assist in determining both a sighting direction towards the point of interest and the distance from the pointing device to the point of interest. The pointing device may for example be a laser pointer or a laser rangefinder or a similar device provided the possibility, either itself or in combination with a display unit, of allowing an operator to sight towards the point of interest. Although not necessary, several acquisitions of a sighting direction and its corresponding distance to the point of interest from a reference location may be made in order to improve the identification of the point of interest.

According to another embodiment, the pointing input may include at least two different sighting directions from the positioning device towards the point of interest. In the present embodiment, an operator of the positioning device may be prompted to point towards the point of interest from two different reference locations such that two different sighting directions are obtained. The position of the point of interest relative to the point of interest may then be determined by identifying the intersection of two different sighting directions.

For example, if the positioning device is equipped with an imaging device, the point of interest may be identified as the intersection of the two sighting directions at which two reference images are captured. In this particular embodiment, the operator of the positioning device may be prompted to capture two reference pictures of the point of interest from two different points of view, i.e. using two different sighting directions. For this purpose, the positioning device may be equipped with a display unit and the imaging device of the positioning device may have a field of view in which a fiducial marker is provided to define a line of sight of the imaging device. The positioning device may then cause an operator to capture at least two reference images by aligning the fiducial marker with the point of interest using at least two different sighting directions.

According to an embodiment, the collected data for determining orientations and positions of the positioning device for the plurality of positions of the positioning device in the global coordinate system may include GNSS data received at the GNSS receiving unit and gyroscopic and acceleration data received at the IMU.

The IMU may be a unit comprising one or more accelerometers and/or one or more gyroscopes. While the GNSS receiving unit, which may also be referred to as a GNSS signals acquisition detector for example, is adapted to collect GNSS signals from which a position may be computed, the IMU is adapted to provide orientation information (pitch, yaw, roll) and acceleration of the positioning device. The IMU therefore provides data representative of the relative movement of the positioning device in space. By fusing/combining the data received from the GNSS receiving unit and the IMU, the data fusing processor can determine the position and orientation of the positioning device at any time in the global coordinate system.

The data fusing processor may be configured to process all measurements received from the GNSS receiving unit and the IMU simultaneously in order to estimate the orientations and the positions of the positioning device in the global coordinate system.

According to an embodiment, in addition to the input received from the IMU, the orientations of the positioning device for the plurality of positions may be further determined based on images captured by the imaging device for at least some of the plurality of positions. In the present embodiment, the imaging device may be used as a complementary source of information in order to improve the determination of the orientation of the positioning device already obtained by the IMU data.

For this purpose, the positioning device may be configured to capture a series of images of the surrounding, or the surface, including the point of interest and the images may then be orientated with respect to each other. Different techniques may be employed for orientating the images of the scene captured by the imaging device.

For example, the captured images may be orientated by identifying common characteristic features among two or more of the captured images. The captured images may for example be orientated using a structure from motion, SFM, technique which is a photogrammetric technique for estimating three-dimensional structures from two-dimensional image sequences that may be coupled with local motion signals.

It will be appreciated that the series of captured images may be orientated based on a known spatial position of the imaging device within the positioning device when capturing each one of the images. In some cases, the spatial position of the imaging device relative to the IMU may vary from one image to another and thus, the known relative spatial relationship between the imaging device and the IMU may be different from one image to another. However, in some other embodiments or configurations, the imaging device may be arranged at a fixed position relative to the IMU within the positioning device such that the known spatial position of the imaging device relative to the IMU within the positioning device is the same.

In other embodiments, rather than using a combination, or a fusion, of data collected at the GNSS receiving unit and the IMU for determining the orientations and positions of the positioning device in the global coordinate system, data from the imaging device and the GNSS receiving unit are collected for a plurality of positions of the positioning device. In these embodiments, a series of images of a scene, surface or environment is captured with (or using) the imaging device.

The method includes orientating the series of captured images with respect to each other and generating a three-dimensional (3D) reconstruction of the scene, surface or environment using the orientated series of captured images.

Further, the method may comprise obtaining positions of the GNSS antenna in the global coordinate system for at least a subset of the captured images based on satellite information signals received at the GNSS antenna. In other words, positions of the antenna in the global coordinate system are determined for at least a subset of the captured images. It will be appreciated that it is not necessary to determine the (3D) positions of the antenna in the global coordinate system for all of the captured images. Thus, in some embodiments, the subset may include only some of the captured images while, in other embodiments, the subset may include all of the captured images. A first list with the 3D positions of the antenna in the global coordinate system for some of the captured images (the subset) is then obtained.

Further, the method may comprise the steps of (arbitrarily) defining a local coordinate system and determining positions of the imaging device for at least some images of the subset in the local coordinate system. The data fusing processor may define the arbitrary local coordinate system. The position of the positioning device, or rather the position of the imaging device of the positioning device, may then be determined in this arbitrary local coordinate system, which is fixed. As a result, a second list with the 3D positions of the imaging device in the local coordinate system for at least some images of the subset is obtained.

As an example, the arbitrary local coordinate system may be a coordinate system centered at the position of the imaging device (or even more precisely the position of a projection center of the imaging device) when capturing one of the images. The position of the imaging device in this local coordinate system may be determined for some or all of the other images captured by the imaging device. This is only one illustrative example and the arbitrary local coordinate system does not need to be centered at the imaging device or its center.

The method may then comprise the step of determining a transformation function correlating a (3D) position of a point in the global coordinate system with a (3D) position of a point in the local coordinate system based on a known spatial position of the GNSS antenna relative to the imaging device within the positioning device when capturing each of the images of the subset, the determined positions of the antenna in the global coordinate system and the corresponding positions of the imaging device in the local coordinate system for the images of the subset, or at least some of them. The known spatial relationship between the GNSS antenna and the imaging device may also be referred to as the antenna offset in the following. In other words, based on the first list of positions of the antenna in the GNSS, the second list of positions of the imaging device in the local coordinate system for at least some images of the subset, and the antenna offset, a transformation function between the global coordinate system and the local coordinate system can be established.

It will be appreciated that the satellite information signals are received at the GNSS antenna of the receiving unit and, thus, the 3D positions computed by the GNSS receiving unit, or a processing unit of the positioning device or the data fusing processor, based on the received signals correspond to the geospatial position of the GNSS antenna. For this reason, the transformation function depends on the antenna offset, i.e. a known spatial position of the imaging device relative to the GNSS antenna (or vice versa) within the positioning device for the images of the subset.

In some embodiments, the spatial position of the imaging device relative to the GNSS antenna may vary from one image to another and thus, the known relative spatial relationship between the imaging device and the GNSS antenna may be different from one image to another. However, in some other embodiments or configurations, the imaging device may be arranged at a fixed position relative to the GNSS antenna within the positioning device such that the antenna offset is always the same.

Further, the antenna offset may be determined as the position of the phase center of the GNSS antenna relative to a principal point (such as the center of a lens or the center of the image sensor of) the imaging device. However, the antenna offset may be determined using other points.

It will be appreciated that the transformation function determines three translations (along three axes X, Y and Z), three rotations (the pitch, the roll and the yaw) and a scale representative of the relationship between the global coordinate system (the absolute coordinate system, as defined by the GNSS), and the local coordinate system as arbitrarily defined by the positioning device. The transformation function enables the conversion of the coordinates of a point in the local coordinate system to its coordinates in the absolute coordinate system, or vice versa.

In one embodiment, the method may include the steps of identifying the point of interest in the generated 3D reconstruction of the scene and determining the position of the point of interest in the local coordinate system. The geospatial position of the point of interest in the GNSS may then be determined based on the determined position of the point of interest in the local coordinate system and the determined transformation function.

The point of interest may for example be identified by identifying the intersection of a sighting direction at which at least one reference image is captured with a plane representative of the 3D reconstruction.

As another example, the point of interest may be identified by identifying the intersection of two different sighting directions at which at least two reference images of the point of interest (i.e. two images while aiming at the point of interest) are captured.

The present embodiment of determining the position of a point of interest is based on the use of data collected at a GNSS receiving unit and images captured at an imaging device. In particular, the method relies on the use of a transformation function to correlate a position in the global coordinate system with a position in a local coordinate system arbitrarily defined by the positioning device. The transformation function is obtained based on the 3D positions of the antenna in the global coordinate system (the first list), the corresponding 3D positions of the imaging device in the local coordinate system (the second list) while capturing a number of images (or video) of the scene and a known spatial relationship between the imaging device and the antenna within the positioning device. In other words, for one of the captured images, the first list provides the position of the antenna in the global coordinate system while the second list provides the position of the imaging device in the arbitrary local coordinate system. From a 3D reconstruction of the scene, as obtained by the captured images, the 3D position of a point identified in the 3D reconstruction may be determined in the local coordinate system and then be converted into a 3D position in the absolute coordinate system using the transformation function.

As a further alternative, the point of interest may be identified by displaying the 3D reconstruction of the scene at a display unit and receiving an input indicating the point of interest in the 3D reconstruction. In this embodiment, the positioning device may be equipped with a display unit or may at least be in connection with a display unit at which the 3D reconstruction can be displayed. An operator of the positioning device may then indicate or select the point of interest by for example pointing at a particular point of the 3D reconstruction reproduced on the display unit. The display unit may for example be a touch screen. The input may also be received by other entry means using arrows and/or a keyboard.

Other embodiments based on photogrammetric technique for automatic identification of the point of interest, for example involving machine learning or template matching, may also be used. It will be appreciated that the point of interest may for example be an object or template with a particular (or unique) marking or pattern intentionally placed in the scene such that the object can be identified using for example template matching, wherein a specific object or template (of a particular pattern, shape or geometry) is looked for in the 3D reconstruction and/or the captured images.

As for the case in which the imaging device may be used to improve the orientation of the positioning device obtained by the IMU, different techniques may be employed for orientating the images of the scene captured by the imaging device in the present embodiment. These techniques include identifying common characteristic features among two or more of the captured images and, in particular, the use of the SFM technique.

Further, in the embodiments based on the use of the GNS receiving unit and the imaging device as primary detectors for determining the orientations and positions of the positioning device for the plurality of positions, the orientation of the captured images may be performed, or further improved, based on acceleration and gyroscopic data received from the IMU of the positioning device.

As mentioned above, the series of captured images may be orientated based on a known spatial position of the imaging device within the positioning device when capturing each one of the images.

In other words, photogrammetric techniques and the use of data from the IMU of the positioning device may be used separately, or in combination, to orientate the captured images.

The positions of the imaging device in the local coordinate system for at least some of the images of the subset may then be determined using the orientated images.

Using the IMU of the positioning device, the arbitrary local coordinate system may be related to a position of the imaging device at a certain time instant (or point of time). Using acceleration and gyroscopic data obtained (or collected) by the IMU, the position of the positioning device in the local coordinate system for the captured images (subsequent to, or preceding, the time instant), or at least some of them, may be determined. Based on a known spatial relationship between the IMU and the imaging device within the positioning device, the position of the imaging device in the local coordinate system for at least some of the captured images can be obtained.

Even for the present embodiments, the spatial position of the antenna relative to the imaging device and/or the IMU within the portable positioning device when capturing each one of the images may be fixed or may vary. In either case, the positioning device may be configured such that the relative spatial position of the IMU, the imaging device and the GNSS receiving unit within the portable positioning device is known when capturing each one of the images.

As already mentioned, in some embodiments, the series of captured images may be a captured video of the scene including the point of interest.

According to some embodiments, the portable positioning device may further include a display unit adapted to assist in capturing the series of images, or video, and/or in identifying the point of interest.

Further, the imaging device may have a field of view in which a fiducial marker is provided to define a line of sight of the imaging device.

The display unit may be configured to display at least one image for the purpose of identifying the point of interest, at least one of an image of the series of images, the 3D reconstruction of the scene, the 3D position of the point of interest determined by the positioning device and an indication as to whether the GNSS receiving unit is activated.

According to some embodiments, the portable positioning device may comprise a body including a first portion for holding the positioning device (for example by hand, such as a smartphone) and a second portion in which at least the GNSS antenna (or the GNSS receiving unit) is arranged. The imaging device may be mounted in for example the first portion.

In some embodiments, the first portion and the second portion may be mounted at a fixed angle with respect to each other. With the imaging device being arranged in the first portion, the antenna offset may be fixed.

In an embodiment, the first portion may be connected to the second portion by means of a hinge to allow the second portion to swing with respect to the first portion. The structural configuration of the positioning device may therefore vary from an unfolded configuration to a folded configuration in which the first portion comes against the second portion. In the present embodiment, the antenna offset may vary from the capture of one image to another. The present embodiment presents the benefit of providing some flexibility for capturing images which would be difficult to obtain with a fixed (unfolded) configuration of the positioning device. It may also provide some flexibility for the operator in holding the positioning device.

In some embodiments, the portable positioning device may be implemented based on an existing device already including a data collector and, optionally, a display unit, to which a module including the GNSS receiving unit with its antenna and the imaging device is added. In other embodiments based on an existing device including also an imaging device and/or an IMU, the add-on module may only include a GNSS receiving unit. The positioning device and/or the data fusing processor may then be adapted to operate in accordance with a method as defined in any one of the preceding embodiments.

It will be appreciated that the data collector may also be referred to as a data processor or control unit as the same unit may have the function of computing the geospatial position of the point of interest and the function of controlling the IMU, the display unit and/or the imaging device, for example. In some other embodiments, these functions may be located in separate units.

Further, the data collector and the data fusing processor may be integrated in the same unit.

According to an embodiment, there is provided a portable positioning device including a GNSS receiving unit and a data fusing processor configured to operate as described in any one of the preceding embodiments. In particular, the positioning device may include an imaging device and/or an IMU and the data fusing processor may be configured to determine orientations and positions of the positioning device based on data collected at the GNSS receiving unit and at least one of data collected at the IMU and images captured by the imaging device. The data fusing processor may then be configured to obtain a pointing input for identifying the point of interest and for determining a position based on the data collected at the GNSS receiving unit, the IMU and/or the imaging device.

According to an embodiment, there is provided a method implemented in a processing unit such as a data fusing processor, wherein the method includes:
  orientating a series of images of a scene,
  generating a 3D reconstruction of the scene using the orientated images,
  defining an arbitrary local coordinate system,
  determining a first set of positions from which at least some of the images have been captured in the local coordinate system,
  obtaining a second set of positions corresponding to the geospatial positions of the portable positioning device in a global coordinate system for said at least some images,
  determining a transformation function correlating a position of a point in the global coordinate system with a position of a point in the local coordinate system based on a known spatial position of the point from which an image has been captured in the positioning device relative to the point at which the geospatial position of the portable positioning device is obtained for each of said at least some images, the first set of positions and the second set of positions,
  identifying a point of interest in the generated 3D reconstruction of the scene,
  determining the position of the point of interest in the local coordinate system, and
  determining the geospatial position of the point of interest in the global coordinate system based on the determined position of the point of interest in the local coordinate system and the determined transformation function.

According to an embodiment, there is provided a method implemented in a processing unit such as a data fusing processor, wherein the method includes:

determining orientations and positions of a positioning device for a plurality of positions of the positioning device in a global coordinate system based on data received from a GNSS receiving unit and an IMU, receiving a pointing input indicative of a position of the point of interest relative to the positioning device for at least one reference position of the positioning device, and determining the geospatial position of the point of interest in the global coordinate system based on the determined orientations and positions of the positioning device in the global coordinate system and the received pointing input.

According to some embodiments of the present disclosure, there is provided a computer program product comprising computer-executable components for performing a method according to any one of the preceding embodiments when the computer-executable components are executed on a processing unit.

According to some embodiments, there is provided a computer-readable digital storage medium comprising a computer program product comprising computer-executable components adapted to, when executed on a processing unit, perform a method according to any one of preceding embodiments.

It is noted that other embodiments using all possible combinations of features recited in the above described embodiments may be envisaged. Thus, the present disclosure also relates to all possible combinations of features mentioned herein. Any embodiment described herein may be combinable with other embodiments also described herein, and the present disclosure relates to all combinations of features.

DESCRIPTION OF THE DRAWINGS

Exemplifying embodiments will now be described in more detail, with reference to the following appended drawings.

As illustrated in the figures, the sizes of the elements and regions may be exaggerated for illustrative purposes and, thus, are provided to illustrate the general structures of the embodiments. Like reference numerals refer to like elements throughout.

DETAILED DESCRIPTION

Exemplifying embodiments will now be described more fully hereinafter with reference to the accompanying drawings, in which currently preferred embodiments are shown. The invention may, however, be embodied in many different forms and should not be construed as limited to the embodiments set forth herein; rather, these embodiments are provided for thoroughness and completeness, and fully convey the scope of the invention to the skilled person.

Figure 1:
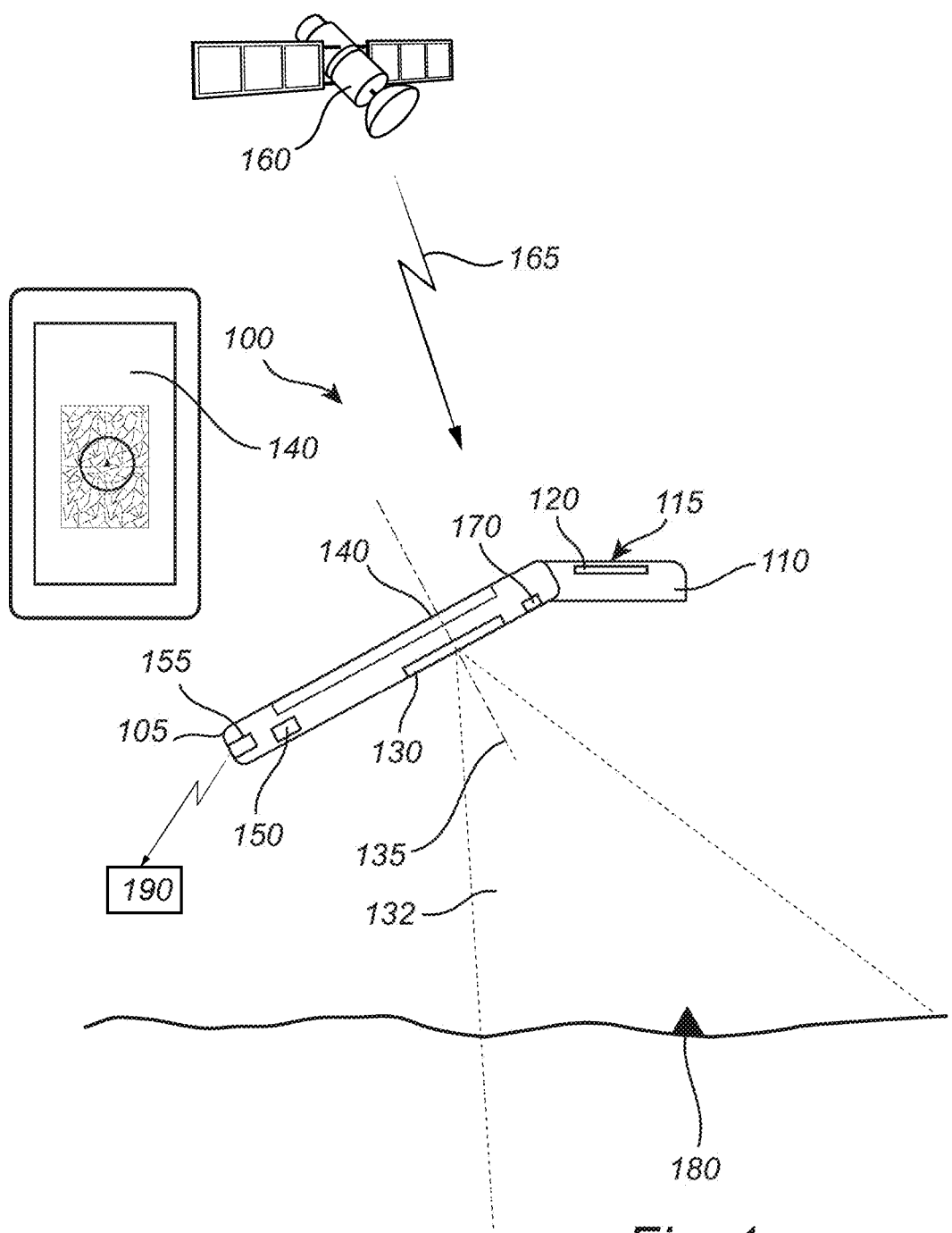
FIG. 1 shows a schematic view of a portable positioning device adapted to determine the geospatial position of a point of interest in accordance with some embodiments.

With reference to FIG. 1, a portable positioning device 100 according to some embodiments of the present disclosure is described.

FIG. 1 shows a portable positioning device 100 comprising a GNSS receiving unit 110 including an antenna 120, an imaging device 130, a display unit 140, an inertial measurement unit, IMU, or a number of gyroscope and accelerometers 170, a processor/processing unit or data collector 150 and a transmitter 155.

FIG. 1 shows also a data fusing processor 190 in communication with the positioning device 100 via the transmitter 155. This is only for illustration purposes and the transmitter 155 may not necessarily be a separate entity. The data fusing processor 190 may, in some embodiments, be in direct communication with each one of the IMU 170, the imaging device 130 and the GNSS receiving unit 110.

Further, although the data fusing processor 190 is shown to be at a remote location, such as for example a remote server of an internet cloud infrastructure, or a remote device in the embodiment of FIG. 1, the data fusing processor 190 may be an integrated part of the positioning device 100.

In some embodiments, the data fusing processor 190 and the data collector 150 may be the same entity.

The antenna 120 may have a phase center 115 and may be adapted to receive satellite information signals from a GNSS. One satellite 160 of the GNSS is depicted in FIG. 1 for illustration purposes. The antenna 120 may be adapted to receive signals from four or more space-based orbiting sources (or satellites) of the GNSS. The antenna 120 may for example include an antenna patch, a ceramic element, a low noise amplifier and filters. The GNSS antenna 120 may be lodged within a housing of the positioning device 100.

The GNSS signals may for example be received from any GNSS such as GPS, GLONASS, Galileo, Compass/Beidou, QZSS, SBAS, IRNSS or the like. The antenna 120 may also be referred to as the GNSS antenna 120. The antenna 120 may be connected, or may be part of, a GNSS receiver or GNSS receiver unit or GNSS board 110. In some embodiments, the GNSS receiving unit 110 may include the GNSS antenna 120 and a processing unit, or processor, for computing a position of the antenna in the GNSS based on the signals received at the antenna. In some other embodiments, the processing unit of the receiving unit may be part of the processing unit 150 of the positioning device 100. The GNSS receiving unit 110 may therefore be adapted to transmit to the processing unit 150 of the positioning device 100 either the satellite information signals received at the antenna 120 or a position computed based on the received signals.

The basic operation principle of a GNSS receiver, or positioning device based on GNSS signals in general, is to calculate its position by precisely timing the signals sent by satellites of the GNSS. Each of the messages broadcasted by the satellites includes a time stamp indicating the time the message was transmitted from the satellite and the satellite position when the message was transmitted. A distance to each of the satellites may then be derived based on the transit time of each message and the speed of light. Computation of these distances may result in the location (two- or three-dimensional position) of the positioning device, or in the present case the phase-center 115 of the antenna 120 of the positioning device 100.

The imaging device 130 of the positioning device 100 is arranged at a certain position relative to the GNSS antenna 120 in the positioning device 100. In the present embodiment, the imaging device 130 is not aligned with the antenna 120 of the positioning device 100. The imaging device 130 may have an optical axis 135 as determined by, for example, the axis or line along which there is rotational symmetry in the imaging device 130. The optical axis 135 of the imaging device 130 may for example correspond to the axis passing through the center of a lens of the imaging device 130 or the axis passing through the center of the image sensor (not specifically shown in FIG. 1) of the imaging device 130. The optical axis 135 of the imaging device 130 may, in some embodiments, but not necessarily, correspond to the line of sight of the imaging device 130, which may also be referred to as the sighting axis. Although not necessary, the phase center 115 of the GNSS antenna 120 may, in some embodiments, be arranged along the optical axis 135 of the imaging device 130.

The imaging device 130 may for example be a digital camera including an image sensor such as a semiconductor charge-coupled device (CCD), a complementary metal-oxide-semiconductor (CMOS) sensor or another active digital pixel sensor.

The display unit 140 of the positioning device 100 may be provided for assisting an operator of the portable positioning device 100 in capturing a series of images of a scene including a point of interest 180 within a field of view 132 of the imaging device 130. The display unit 140 may also be used for assisting in identifying, or selecting, a point of interest in the scene, as will be further explained with reference to FIG. 8. FIG. 1 shows also a front view of the display unit 140 in which an image of the ground within the field of view 132 of the imaging device 130 is displayed. For illustration purposes, the point of interest 180 is identified by a triangle in the image displayed in the display unit 140.

The IMU 170 may be adapted to provide acceleration and gyroscopic data about the positioning device 100.

The data collector or processor 150 may be in communication with the imaging device 130, the GNSS receiving unit 110, the display unit 140 and the IMU 170. In particular, the data collector or processor 150 may be adapted to receive GNSS signals (or satellite information signals) from the GNSS receiving unit 110 or, as the case may be, directly a position of the GNSS antenna 120 of the GNSS receiving unit 110 as computed by the GNSS receiving unit 110.

Further, the data collector or processor 150 may be adapted to control the imaging device 130 to cause the capture of one or more images in order to obtain a scan of a scene at which the point of interest 180 is located. The data collector or processor 150 may also be adapted to receive the images, or at least data corresponding to the images, captured by the imaging device 130.

Similarly, the data collector or processor 150 may be adapted to receive data collected by the IMU 170. Further, the data collector or processor 150 may be adapted to control the information and/or images displayed by the display unit 140 and also adapted to receive information entered by an operator via the display unit 140.

In other words, the positioning device 100 comprises a data collector or processor 150 and three different types of sensors including the imaging device 130, the GNSS receiving unit 110 and the optional IMU 170. The display unit 140 may be used to display information and/or to receive information.

As will be described in the following, a geospatial position of a point of interest 180 in a scene may be determined based on data collected at the GNSS receiving unit and either one, or both, of data collected at the IMU 170 and images captured with the imaging device 130.

Thus, still referring to FIG. 1, according to an embodiment, the imaging device 130 of the positioning device 100 may be optional and may more generally be a pointing device 130. In this embodiment, the GNSS receiving unit 110 and the IMU 170 are used as the primary detectors for determining the geospatial position of the point of interest.

According to another embodiment, the IMU 170 of the positioning device may be optional and the GNSS receiving unit 110 and the imaging device 130 are used as the primary detectors for determining the geospatial position of the point of interest.

According to yet another embodiment, as shown in FIG. 1, the positioning device 100 may include both an imaging device 130 and an IMU 170. The data collector 150 of the positioning device 100 may then be configured to collect the data received at the GNSS receiving unit 110 and either one, or both, of the data received at the IMU 170 and the imaging device 130 for obtaining a geospatial position of the point of interest 180.

In the following, a procedure based on data collected at the GNSS receiving unit 110 and the imaging device 130 for determining a geospatial position of the point of interest 180 is first described with reference to FIGS. 2-5.

Figure 2:
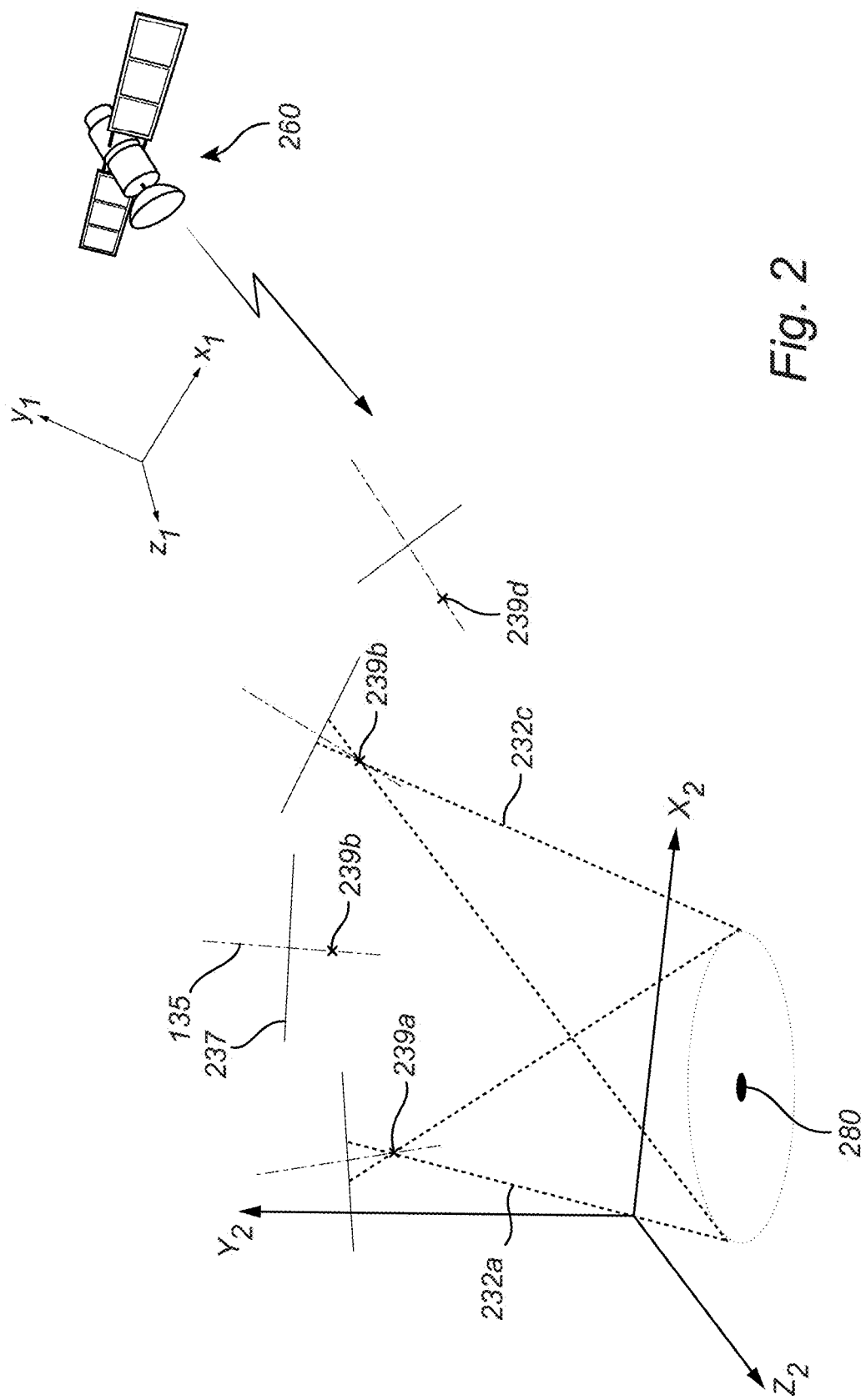
FIG. 2 illustrates at least part of a workflow, or scenario, of a method for determining the geospatial position of a point of interest, in accordance with some embodiments.

FIG. 2 illustrates an embodiment of at least part of a workflow of a method for determining the geospatial position of a point of interest using a portable positioning device such as for example the positioning device 100 described with reference to FIG. 1.

FIG. 2 shows a scenario in which the positioning device 100 is placed at four different positions for capturing four different images of a scene including a point of interest denoted 280. For illustration purposes, only a part of the positioning device 100 is represented in FIG. 2. In particular, the positioning device is represented by a plane 237 which may correspond to the image chip (or image sensor) in the imaging device 130 of the positioning device 100.

In the embodiment shown in FIG. 2, the data collector or processor 150 of the positioning device 100 may cause the capture of four overlapping images of the scene at which the point of interest 280 is located, as represented by the overlapping zones 232a and 232c of the field of view of the imaging sensor 237. For this purpose, an operator may move at different places and capture a series of images, such as four in the present example, of the scene. The four different locations at which the four images of the scene are captured may correspond to the positions 239a, 239b, 239c and 239d of the projection center of the imaging device 130 (the lens being not shown in FIG. 2). It will be appreciated that another point of the imaging device may be taken as a reference such as for example the center of the imaging sensor 237.

The positioning device 100, or rather the data fusing processor 190, may define an arbitrary local coordinate system ($X_2$, $Y_2$, $Z_2$). As illustrated in FIG. 2, the arbitrary coordinate system does not need to be centered at one of the positions 239a, 239b, 239c or 239d of the imaging device 130 from which the images are captured. It will be appreciated that the positions 239a, 239b, 239c and 239d are arbitrary selected by the operator of the positioning device 100 when capturing the images, or a video, of the scene and the positions of the imaging device in the arbitrary coordinate system ($X_2$, $Y_2$, $Z_2$) for the four different images are thus, as such, not known at the beginning of the method.

FIG. 2 shows also only one satellite 260 from which GNSS signals may be sent to an GNSS antenna (not shown in FIG. 2) of the positioning device 100. As mentioned above, the GNSS receiving unit may receive signals from four or more satellites and the signals may be computed to determine the position of the phase center of the antenna 120 of the positioning device 100 in an absolute coordinate system ($X_1$, $Y_1$, $Z_1$) relating to the GNSS.

In the following, with reference to FIGS. 1-5, a method for determining a geospatial position of the point of interest 180, 280 will be described.

It will be appreciated that, although described in a specific order in the following, the steps may be performed in another order. Generally, the method includes steps for determining a position of the point of interest in the local coordinate system ($X_2$, $Y_2$, $Z_2$) and then derive the geospatial position of the target point (or point of interest) 280 in the absolute coordinate system ($X_1$, $Y_1$, $Z_1$) from its position in the local coordinate system ($X_2$, $Y_2$, $Z_2$).

Figure 3:
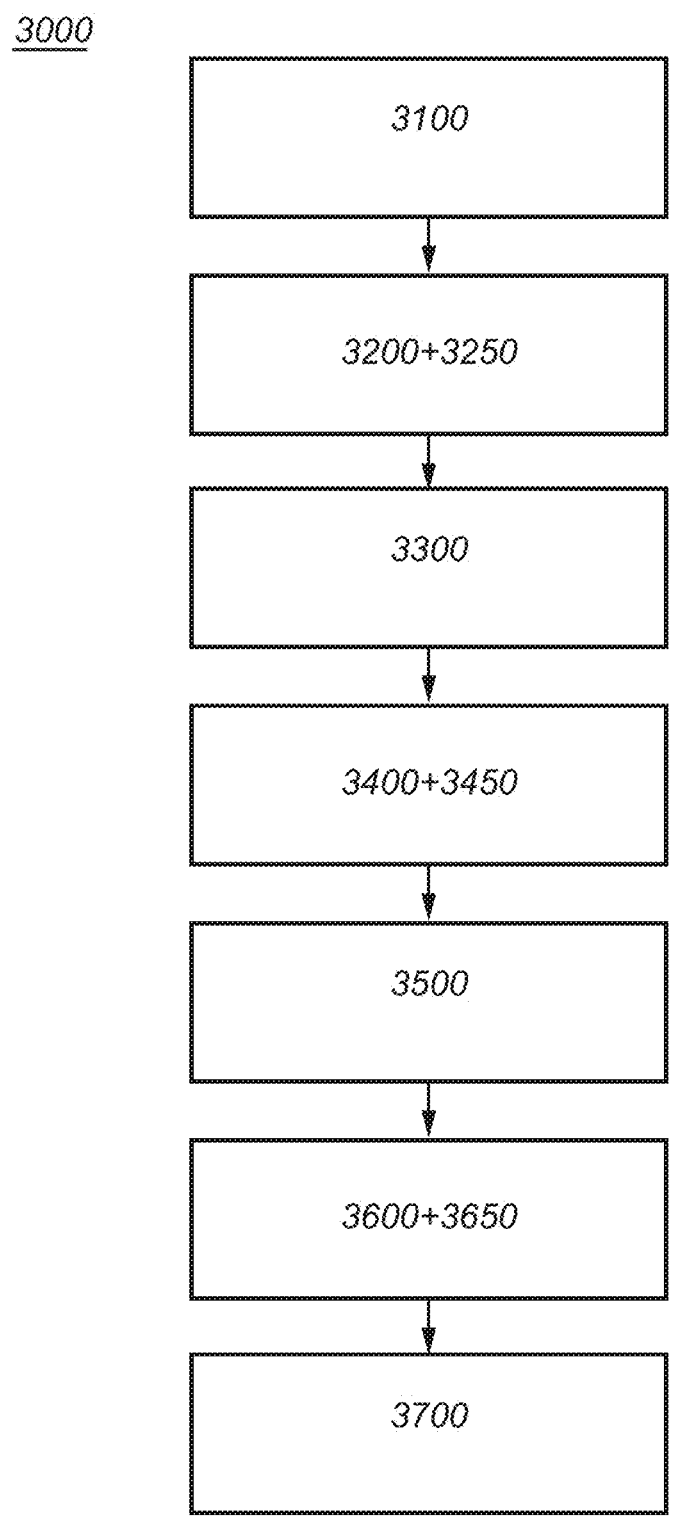
FIG. 3 shows a flow chart illustrating a general overview of a method for determining the geospatial position of a point of interest in accordance with some embodiments.

As illustrated in FIG. 3, the method includes a step 3100 of capturing, or causing the capture of, a series of images of the scene in which the point of interest 180, 280 is located. Step 3100 corresponds for example to the scenario depicted in FIG. 2 wherein four images are taken at four different positions of the positioning device 100. It will be appreciated that the use of four images is just an example and that at least three images may be captured.

Figure 4:
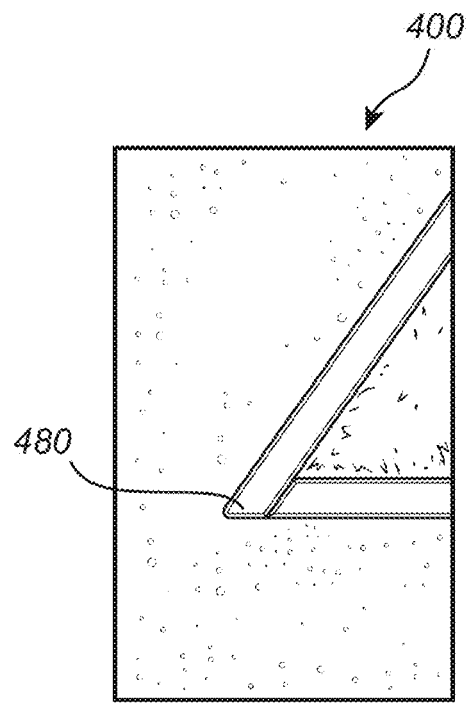
FIG. 4 shows an example of a two-dimensional image captured by a portable positioning device in accordance with an embodiment.

An example of a two-dimensional image of a path border captured by the imaging device 130 is shown in FIG. 4 for illustration purposes. The corner of the path border may be the point of interest 480 in the present example. The procedure may be repeated a number of times such that a plurality, or a series, of images of the path border and its surrounding is captured.

Referring to FIG. 3, at 3200, the captured images (four in the present example) may then be orientated with respect to each other and a three-dimensional (3D) reconstruction of the scene may be generated, at 3250, using the orientated series of captured images.

It will be appreciated that the captured images may be orientated in real time in the sense that they are successively orientated as they are captured. It is therefore not necessary to wait until all images have been captured. Further, the orientation of the images may, as such, not be static in that the orientation of an already orientated image may be refined, or readjusted, based on newly captured images.

Different techniques may be employed for orientating the images of the scene captured by the imaging device.

According to an embodiment, the captured images may be orientated by identifying common characteristic features among the captured images and/or by using the SFM technique or any other photogrammetric technique enabling to orientate images with respect to each other based on the content of the captured images themselves. Based on a recognition of characteristic features in the captured images, for example based on contrast/brightness values representative of different levels of light reflectivity of the objects of the scene, the images may be orientated.

Turning to the example illustrated in FIG. 2, the series of images may not necessarily be captured in the order defined by the positions 239a, 239b, 239c and 239d of the imaging device 130. Assuming that the images are captured in a different order, and/or using different sighting directions, for example in a sequence at positions 239a, 239c, 239d and 239b, such photogrammetric techniques enable to orientate the images with respect to each other by recognizing characteristic features between the images. It will also be appreciated that it is beneficial if the images to be orientated with respect to each other overlap.

According to an embodiment, if the positioning device 100 includes an IMU 170, the captured images may be orientated at 3200 based on acceleration and gyroscopic data received from the IMU 170 of the positioning device 100. In other words, in this embodiment, the images may be orientated based on data representative of the motion of the imaging device between the capture of different images instead of being based on the content of the images themselves. For example, from a first position of the IMU 170 when capturing the first image, the acceleration and gyroscopic data obtained from the IMU 170 enable to know the relative position of the imaging device when the next image is captured. Based on the data obtained by the IMU 170 for the series of captured images, the images can be orientated with respect to each other.

Further, although the position of the imaging device 130 is represented to be fixed with respect to the position of the IMU 170 in the positioning device 100 shown in FIG. 1, the imaging device 130 may, in some other embodiments, be arranged in a movable or adjustable manner relative to the IMU 170 in the positioning device 100. In this case, the spatial position of the imaging device 130 relative to the IMU 170 may vary from the capture of one image to another. The position of the imaging device 130 relative to the IMU 170 may be known, for example using some kind of encoder (angle detector) of the positioning device or the like, and the observation of the IMU 170 for the different images may be corrected accordingly.

Further, the observations of the IMU 170 when capturing the series of images may be used in combination with photogrammetric techniques for orientating the images in order to improve the orientation of the images.

Figure 5:
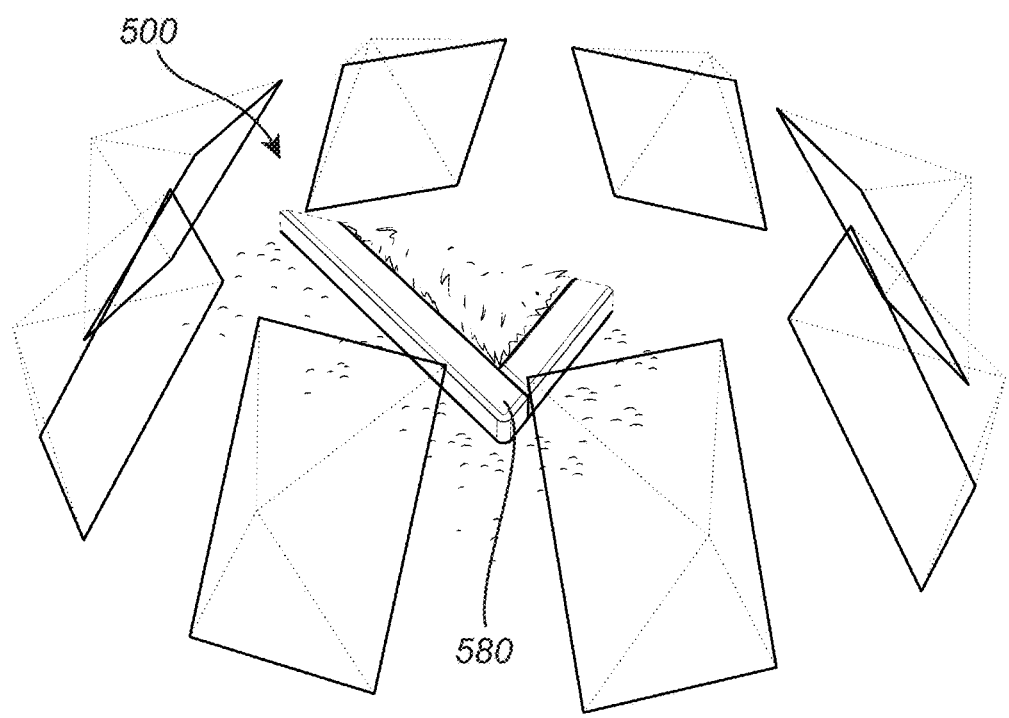
FIG. 5 shows an example of a 3D reconstruction generated by a portable positioning device in accordance with an embodiment.

As mentioned above, the processing unit 150 may then be adapted, at 3250, to generate a 3D reconstruction of the scene based on the orientated series of images. FIG. 5 shows an example of the scene captured by images such as the image shown in FIG. 4, i.e. FIG. 5 shows a 3D reconstruction of the path border with its corner 580. The 3D reconstruction may for example be displayed at the display unit 140 of the positioning device 100.

Turning again to FIG. 3, at 3300, positions of the antenna 120 in the global coordinate system for at least a subset of the captured images may be determined based on satellite information signals received at the GNSS antenna 120. In the present example, the 3D positions of the antenna 120 in the global coordinate system may be determined for at least three or four of the captured images. Accordingly, a first list with the 3D positions of the antenna in the global coordinate system for some of the captured images (the subset) is obtained.

Further, the data fusing processor 190 may at 3400 define an arbitrary local coordinate system ($X_2$, $Y_2$, $Z_2$), which is fixed with respect to the absolute coordinate system ($X_1$, $Y_1$, $Z_1$) of the GNSS and may at 3450 determine the positions of the imaging device for at least some of the captured images, such as for example three or four of the images in the present example, in the local coordinate system ($X_2$, $Y_2$, $Z_2$).

As for the orientation of the images captured by the imaging device 130, the position of the imaging device 130 in the local coordinate system ($X_2$, $Y_2$, $Z_2$) for three or more of the images may be determined by photogrammetry based on the generated 3D reconstruction, using for example a triangulation technique, and/or based on acceleration and/or gyroscopic data received from the IMU 170 of the positioning device 100.

As a result, a second list with the 3D positions of the imaging device in the local coordinate system for at least some images of the subset is obtained.

The data fusing processor 190 may then at 3500 determine a transformation function correlating a position of a point in the global coordinate system ($X_1$, $Y_1$, $Z_1$) with a position of a point in the local coordinate system ($X_2$, $Y_2$, $Z_2$) based on the determined 3D positions of the antenna 120 in the global coordinate system, the corresponding positions of the imaging device 130 in the local coordinate system ($X_2$, $Y_2$, $Z_2$) for the images of the subset and a known spatial position of the imaging device 130 relative to the GNSS antenna 120 within the positioning device 100 for the captured images (the antenna offset). Although the spatial position of the imaging device relative to the GNSS antenna may vary from one image to another, in the present example the known spatial position of the imaging device 130 relative to the GNSS antenna 120 within the positioning device 100 is the same.

In other words, the first list of 3D positions of the antenna in the global coordinate system, the second list of 3D positions of the imaging device in the local coordinate system for at least some images of the subset, and the known spatial position of the antenna relative to the imaging device within the portable positioning device when capturing each one of the images are used by the processing unit to establish the transformation function between the global coordinate system (the absolute coordinate system) and the local coordinate system.

It will be appreciated that at least three non-identical images, and in particular non-collinear (i.e. not taken along the same sighting axis), may be used for the purpose of determining the transformation function for correlating the position of a point in the local coordinate system with the position of a point in the absolute coordinate system.

The data collector or processor 150 may receive a pointing input such that the data fusing processor 190 can identify at 3600 the point of interest 580 in the generated 3D reconstruction 500 of the scene and determine at 3650 the 3D position of the point of interest in the local coordinate system based on the generated 3D reconstruction. The geospatial position of the point of interest in the global coordinate system may then be determined at 3700 based on the determined 3D position of the point of interest in the local coordinate system and the determined transformation function.

The geospatial position of the point of interest may be its three-dimensional position in the global coordinate system but may also include only a two-dimensional position or only the altitude, as desired.

As already mentioned, in some embodiments, the series of captured images may be a captured video of the scene including the point of interest.

Further, the display unit may be configured to display a two-dimensional image 400 of the series of images, the 3D reconstruction 500 of the scene, the 3D position of the point of interest determined by the processing unit and/or an indication as to whether the GNSS receiving unit is activated.

In the following, another procedure based on data collected at the GNSS receiving unit 110 and the IMU 170 for determining a geospatial position of the point of interest 180 is described.

As for the procedure described above in which the data from the GNSS receiving unit 110 and images from the imaging device 130 are used to provide some kind of 3D reconstruction of the surrounding in which the point of interest is located, a first step is to determine the orientations and positions of the positioning device in the vicinity of the point of interest in the global coordinate system.

For this purpose, the operator may, as shown in FIG. 2 for the embodiment based on the use of the imaging device data, position the positioning device at different locations above the point of interest. The data collector 150 may then be configured to collect the GNSS data received at the GNSS receiving unit 110 and the acceleration and gyroscopic data detected by the IMU 170 during this procedure.

While the GNSS receiving unit 110 provides positions of the positioning device, the IMU 170 provides data representative of the motion of the positioning device between the capture of the different GNSS data. From a first reference position of the positioning device 100 (which may arbitrarily selected), the acceleration and gyroscopic data obtained from the IMU 170 enable to know the position and orientation of the positioning device relative to its position and orientation at the first reference position.

Accordingly, the positions and orientations of the positioning device 100 in the vicinity, or above, a surface including the point of interest may be determined in the global coordinate system at any instant based on the data obtained by the IMU 170 and the GNSS receiving unit 110. The collection of the data may be made by the data collector 150 while the determination of the orientations and positions may be performed by the data fusing processor 190.

The data collector 150 may then be configured to obtain a pointing input, in the form of for example a sighting direction and a distance, or two different sighting directions, in order to identify the point of interest. The pointing input may be obtained by means of a pointing device such as a laser rangefinder, a laser pointer (not shown) and/or the imaging device 130. The pointing input may be indicative of a position of the point of interest 180 relative to the positioning device 100.

The pointing input may then be transmitted to the data fusing processor 190 for determining the geospatial position of the point of interest 180 in the global coordinate system.

Figure 6:
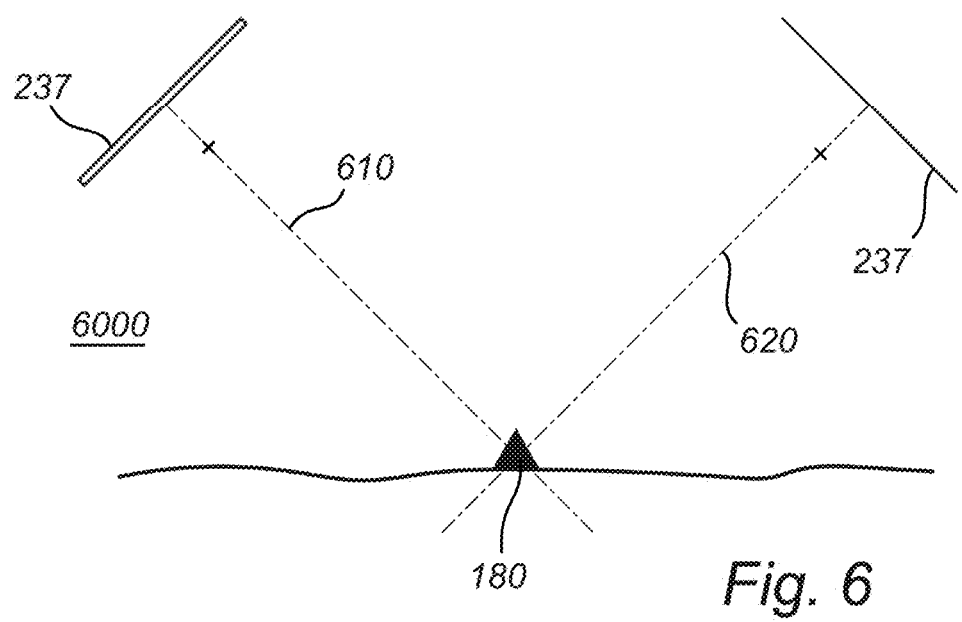
FIG. 6 illustrates the identification of a point of interest in accordance with an embodiment.
Figure 7:
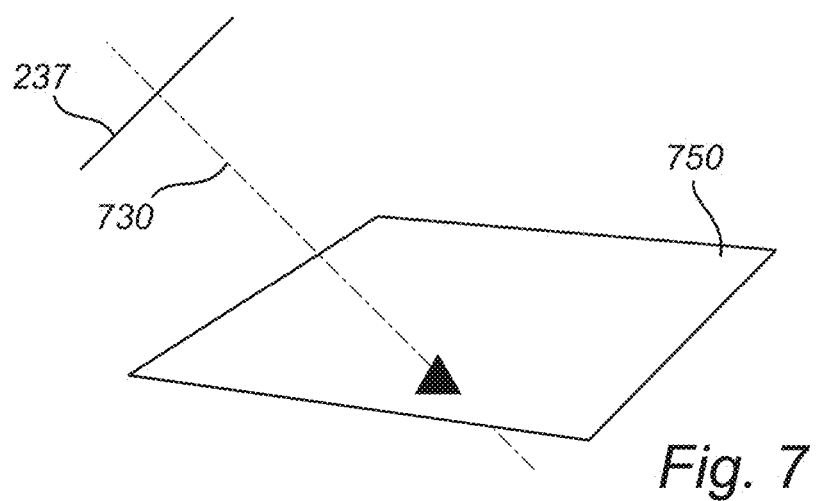
FIG. 7 illustrates the identification of a point of interest in accordance with another embodiment.
Figure 8:
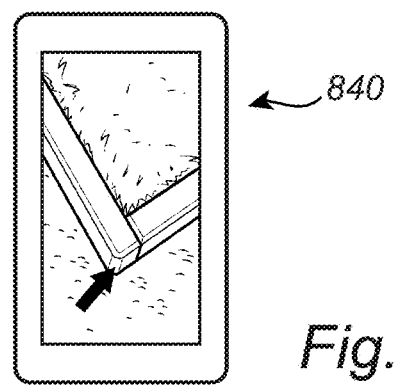
FIG. 8 illustrates the identification of a point of interest in accordance with yet another embodiment.

With reference to FIGS. 6-8, different techniques for identifying the point of interest at which the geospatial position is to be determined are described.

According to an embodiment, FIG. 6 illustrates that the point of interest 180 may be identified as the intersection of two different sighting directions. For example, the point of interest may be identified by capturing at least two reference images, using at least two different sighting directions 610 and 620, of a portion of the scene at which the point of interest 180 is located. For this purpose, the imaging device may be equipped with a fiducial marker assisting the operator in sighting towards the point of interest. The point of interest can then be determined by the data collector or processor 150 or the data fusing processor 190 to be at the intersection between the two sighting directions 610 and 620.

Although the embodiment shown in FIG. 6 is based on the use of an imaging device 130 as a pointing device, which is convenient in particular if the imaging device is also used together with the GNSS receiving unit for determining the orientations and positions of the positioning device in the global coordinate system, the pointing device may be another device having the possibility of providing sighting directions towards a point of interest such as a laser rangefinder or a laser pointer for example. The input from the pointing device may be collected at the data collector 150 and then transmitted by the transmitter 155 to the data fusing processor 190 for identifying the point of interest.

In accordance with another embodiment, FIG. 7 illustrates that the point of interest 180 may be identified by capturing at least one reference image, using at least one sighting direction 730, of a portion of the scene at which the point of interest is located. The point of interest may be determined as the intersection of the sighting direction with a plane 750 representative of the 3D reconstruction.

In the embodiment shown in FIG. 7, an imaging device 130 is used as a pointing device. Further, for the embodiment in which the imaging device is used together with the GNSS receiving unit for determining the orientations and positions of the positioning device in the global coordinate system, wherein a 3D reconstruction of the surrounding is generated, it is possible to identify the point of interest as the intersection of the sighting direction with a plane 750 representative of the 3D reconstruction.

However, in other embodiments based on, for example, the use of the data from the IMU and the GNSS receiving unit, the pointing input may be a sighting direction, as shown in FIG. 7, and a distance from the positioning device to the point of interest (for the position from which the sighting direction is obtained).

The pointing device may be a device providing a sighting direction and the possibility of measuring a distance such as a laser rangefinder for example. The input from the pointing device may be collected at the data collector 150 and then transmitted by the transmitter 155 to the data fusing processor 190 for identifying the point of interest.

In accordance with another embodiment, FIG. 8 illustrates that the point of interest may be identified by displaying the 3D reconstruction 500 of the scene at the display unit 140 and by receiving an input indicating the point of interest in the 3D reconstruction. The display unit may be a touch screen with zooming function such that an operator can point at the point of interest, such as illustrated by the arrow in FIG. 8.

Further, the point of interest may not necessarily be located in one of the images for which the position of the GNSS antenna has been obtained and/or for which the position of imaging device has been determined. As long as the point of interest is located in the 3D reconstruction, the position of the point of interest in the local coordinate system can be determined by photogrammetry and its absolute position can be determined using the transformation function.

Again, although the determination of the geospatial position of the point of interest has now been described by procedures using data from the GNSS receiving unit 110 and either one of data from the IMU 170 and images captured with the imaging device 130, the geospatial position may be obtained by the data fusing processor 190 using all data collected at these three detectors.

Further, it will be appreciated that the procedures may be complementary in the sense that the orientations and positions of the positioning device in the global coordinate system in the surrounding of the point of interest may first be determined using the imaging device 130 (and the GNSS receiving unit 110) and, if it becomes difficult or impossible to determine the orientations and positions based on the captured images, for example because of darkness and/or contrast issues, it is possible to continue the recording of the orientations and positions of the positioning device using the data received from the IMU (and vice versa).

Figure 9:
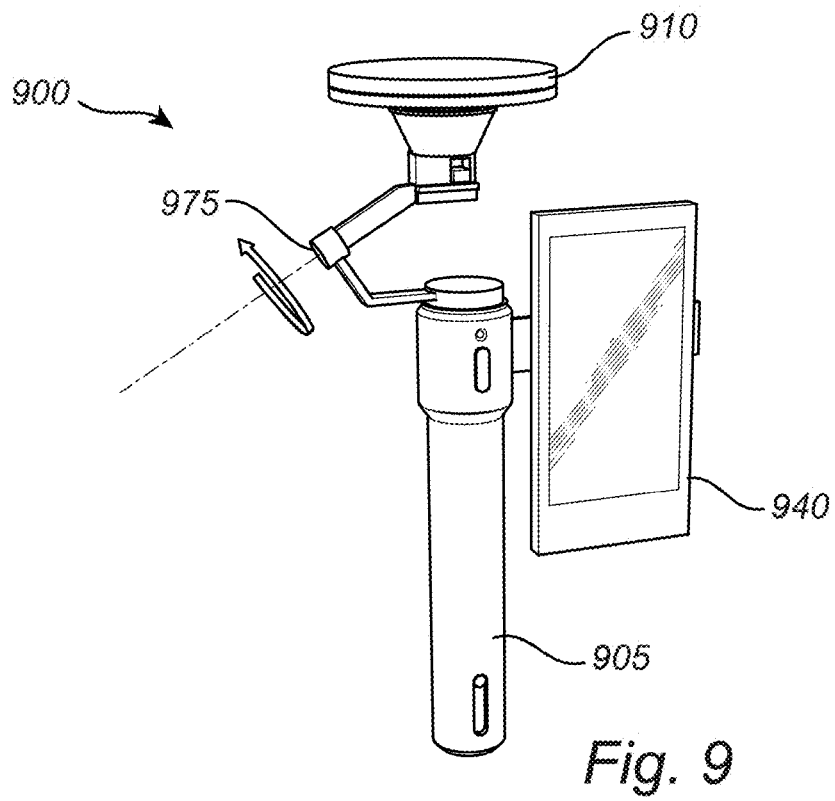
FIG. 9 shows a schematic view of a portable positioning device in accordance with an embodiment.

With reference to FIG. 9, a positioning device in accordance with another embodiment is described.

FIG. 9 shows a portable positioning device 900 including a GNSS receiving unit 910 and a display unit 940. The portable positioning device 900 includes also a body 905 in which the processing unit (not shown) of the positioning device 900 may be arranged. Alternatively, the processing unit of the positioning device may be arranged in the same unit as the display unit, such as for example at the backside of the display unit 940. In the embodiment shown in FIG. 9, the body 905 is in the form of a cylinder which may be convenient to be handheld by an operator. However, other geometries and arrangements may be envisaged.

In some embodiments, the element denoted 940 in FIG. 9 may be a smartphone including a display unit 940, a processing unit and an imaging device (not shown in this view). In the present example, the positioning device 900 may include the body 905 and a holder, or holding element (not denoted), attached to the body 905 and adapted to receive a unit including an imaging device, a display unit and a processing unit, such as e.g. a smartphone.

Generally, the processing unit, the imaging device, the display unit, the GNSS receiving unit and the IMU of the positioning device 900 may be equivalent, on a functional point of view, to the processing unit 150, the imaging device 130, the display unit 140, the GNSS receiving unit 110 and the IMU 170 of the positioning device 100 described with reference to FIGS. 1-8. The characteristics described in the preceding embodiments for these elements therefore apply to the present embodiment.

In the present embodiment, the GNSS receiving unit 910, or at least its antenna, is arranged to be positioned horizontally. For this purpose, the positioning device 900 may be equipped with a stabilization device 975 to maintain the GNSS in a horizontal position. In the present example, the stabilization device 975 may comprise a tilt sensor for detecting a deviation of the antenna of the GNSS receiving unit 910 from horizontal and a motorized system for rotating the GNSS receiving unit 910 such that it is maintained in a horizontal position.

FIG. 9 illustrates also embodiments of the present disclosure in which the portable positioning device may be implemented based on an existing device 940 already including a processing unit, an imaging device and, optionally, a display unit, to which a module including the GNSS receiving unit is added. Expressed differently, embodiments of the present disclosure include an add-on module only including a GNSS receiving unit with its antenna, in which the processing unit of the existing device is adapted to operate in accordance with a method as defined in any one of the preceding embodiments.

In the present embodiment, the processing unit of the existing device may function as the data collector 150 and/or the data fusing processor 190 described with reference to the preceding embodiments (see FIG. 1).

Figure 10:
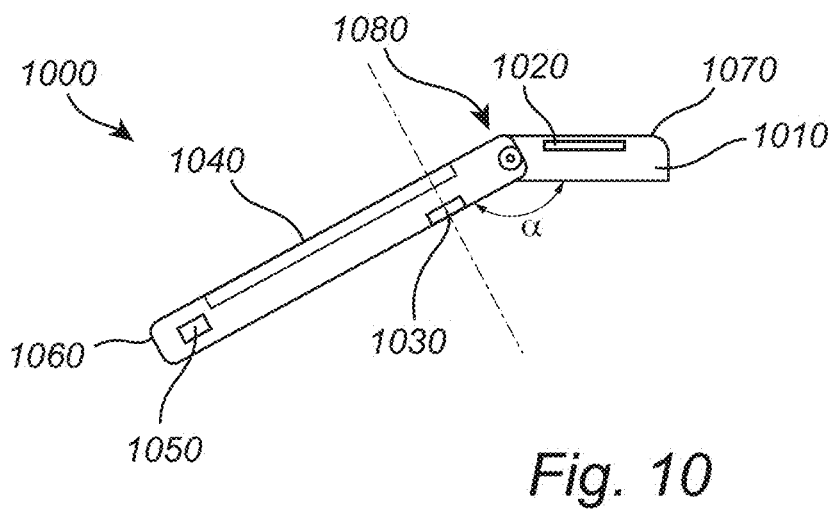
FIG. 10 shows a schematic view of a portable positioning device in accordance with another embodiment.

FIG. 10 shows a schematic view of a portable positioning device 1000 in accordance with another embodiment.

The portable positioning device 1000 may comprise a body including a first portion 1060 for holding the positioning device (for example by hand, such as a smartphone) and a second portion 1070 in which at least the GNSS antenna (or the GNSS receiving unit) is arranged. The imaging device 1030 may be provided in the first portion 1060.

In the present embodiment, the first portion 1060 and the second portion 1070 are not mounted at a fixed angle with respect to each other but, instead, the first portion 1060 is connected to the second portion 1070 by means of a hinge 1080 to allow the second portion 1070 to swing or rotate with respect to the first portion 1060. The rotation of the second portion 1070 about the hinge 1080 is represented by the angle a formed between the first portion 1060 and the second portion 1070. The structural configuration of the positioning device 1000 may therefore vary from an unfolded configuration, in which the angle α is different from zero, and a folded configuration in which the first portion 1060 comes against the second portion 1070 such that the angle α is equal to, or at least close to, zero.

Figure 11:
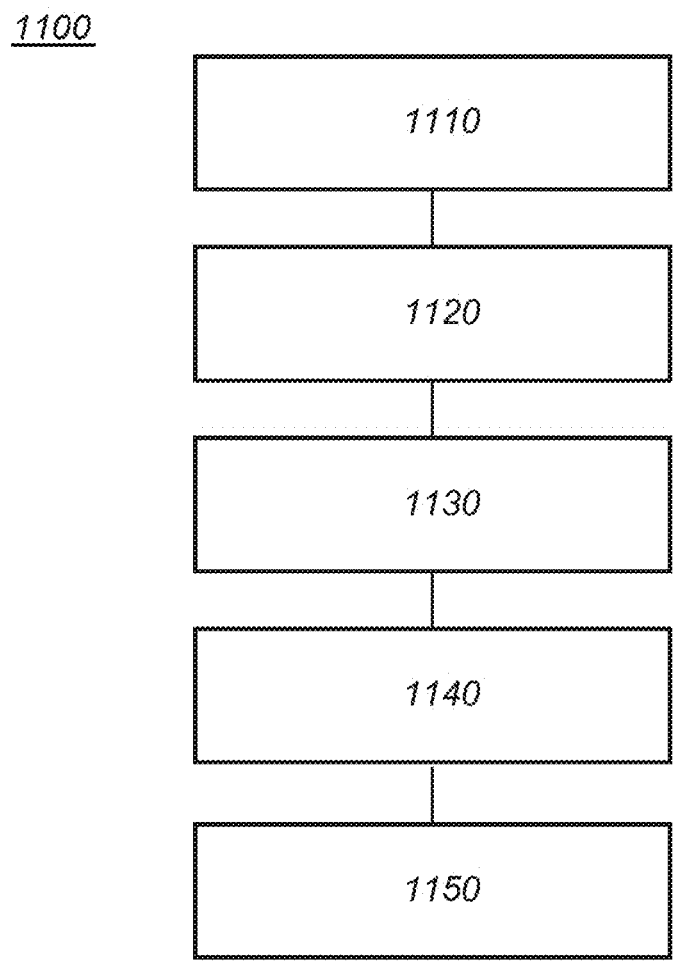
FIG. 11 is a flow chart illustrating the methods of the present disclosure.

Referring to FIGS. 1 and 11, a method for determining a geospatial position of a point of interest in accordance with some embodiments is described.

The method comprises, at 1110, collecting, by a data collector 150 of a positioning device 100, data from the GNSS receiving unit 110 of the positioning device 100 and data from at least one of the imaging device 130 and the IMU 170 of the positioning device for a plurality of positions of the positioning device in the vicinity of the point of interest.

The method may then comprise, at 1120, transmitting 1120 to a data fusing processor 190 the collected data for determining orientations and positions of the positioning device for the plurality of positions of the positioning device in a global coordinate system $(X_1, Y_1, Z_1)$.

The method may then include, at 1130, obtaining by the data collector 150 a pointing input indicative of a position of the point of interest 180 relative to the positioning device 100 for at least one reference position of the positioning device. The pointing input may then be transmitted, at 1140, to the data fusing processor 190 for identifying the point of interest. The geospatial position of the point of interest in the global coordinate system may then be determined, at 1150, by the data fusing processor 190 based on the determined orientations and positions of the positioning device in the global coordinate system and the pointing input.

The person skilled in the art realizes that the present invention by no means is limited to the preferred embodiments described above. On the contrary, many modifications and variations are possible within the scope of the appended claims.

For example, the positioning device may include a plurality of imaging devices in order to improve its orientation in the surrounding of the point of interest. Using a plurality of imaging devices provides the benefit of providing an image covering a larger portion of the surrounding for each one of the locations at which the positioning device is held by the user (i.e. without being limited to the field of view of a single imaging device). For each of the plurality of positions of the positioning device in the vicinity of the point of interest, the imaging device(s) may be configured to provide a panoramic view or an image with an extended field of view to cover at least more than one direction.

It will be appreciated for example that the point of interest does not necessarily need to be a terrain point. The present method and the positioning device thereof provide the benefit that the point of interest may be located anywhere, i.e. may be any point in a scene or environment captured by the imaging device in the series of images. For example, the point of interest may be located on the ground, on a wall, above the operator or elevated such as a point located on the roof of a building.

Although features and elements are described above in particular combinations, each feature or element can be used alone without the other features and elements or in various combinations with or without other features and elements. In the above, a processor or processing unit may include, by way of example, a general purpose processor, a special purpose processor, a conventional processor, a digital signal processor (DSP), a plurality of microprocessors, one or more microprocessors in association with a DSP core, and any other type of integrated circuit (IC).

Further, although applications of the positioning device have been described with reference to surveying systems, the invention may be used in other applications and/or systems.

Additionally, variations to the disclosed embodiments can be understood and effected by the skilled person in practicing the claimed invention, from a study of the drawings, the disclosure, and the appended claims. In the claims, the word "comprising" does not exclude other elements, and the indefinite article "a" or "an" does not exclude a plurality. The mere fact that certain features are recited in mutually different dependent claims does not indicate that a combination of these features cannot be used to advantage.

The invention claimed is:

1. A method implemented by a data fusing device, wherein the method comprises:
    orientating a series of images of a scene to provide orientated images;
    generating a 3D reconstruction of the scene using the orientated images;
    defining an arbitrary local coordinate system;
    determining a first set of positions from which at least some of the series of images have been captured in the local coordinate system, the series of images captured using a portable positioning device;
    obtaining a second set of positions corresponding to geospatial positions of the portable positioning device in a global coordinate system for said at least some of the series of images, the second set of positions determined using the portable positioning device;
    determining a transformation function correlating a position of a point in the global coordinate system with a position of the point in the local coordinate system based on a known spatial position of a point from which an image of the series of images has been captured by the portable positioning device relative to the point at which the geospatial positions of the portable positioning device are obtained for said at least some of the series of images, the first set of positions, and the second set of positions;
    identifying a point of interest in the generated 3D reconstruction of the scene;

determining the position of the point of interest in the local coordinate system; and determining a geospatial position of the point of interest in the global coordinate system based on the determined position of the point of interest in the local coordinate system and the determined transformation function.

2. The method of claim 1 wherein the data fusing device is integrated with the portable positioning device.

3. The method of claim 1 wherein the data fusing device is separate from the portable positioning device.

4. The method of claim 1 wherein the data fusing device is configured on a computer or server that is remote from the portable positioning device.

5. The method of claim 1 wherein the data fusing device is configured on a server within an internet cloud infrastructure.

6. A computer program product comprising computer-executable components for performing the method according to claim 1 when the computer-executable components are executed on a processing unit.

7. A computer-readable digital storage medium comprising a computer program product comprising computer-executable components adapted to, when executed on a processing unit, perform the method according to claim 1.

8. A method implemented by a processing unit, wherein the method comprises:

orientating a series of images of a scene to provide orientated images;

generating a 3D reconstruction of the scene using the orientated images;

defining a local coordinate system;

determining a first set of positions from which at least some of the series of images have been captured in the local coordinate system, the series of images captured using a portable positioning device;

obtaining a second set of positions corresponding to geospatial positions of the portable positioning device in a global coordinate system for said at least some of the series of images;

determining a transformation function correlating a position of a point in a global coordinate system with a position of the point in the local coordinate system based on a known spatial position of a point from which an image of the series of images has been captured by the portable positioning device relative to the point at which the geospatial positions of the portable positioning device are obtained for said at least some of the series of images, the first set of positions, and the second set of positions;

identifying a point of interest in the generated 3D reconstruction of the scene;

determining the position of the point of interest in the local coordinate system; and determining a geospatial position of the point of interest in the global coordinate system based on the determined position of the point of interest in the local coordinate system and the determined transformation function.

9. The method of claim 8 wherein the processing unit is a data fusing processor.

10. The method of claim 8 wherein the local coordinate system has an arbitrary definition.

11. The method of claim 8 wherein the processing unit is integrated with the portable positioning device.

12. The method of claim 8 wherein the processing unit is separate from the portable positioning device.

13. The method of claim 8 wherein the processing unit is configured on a computer or server that is remote from the portable positioning device.

14. The method of claim 8 wherein the processing unit is configured on a server within an internet cloud infrastructure.

15. A computer program product comprising computer-executable components for performing the method according to claim 8 when the computer-executable components are executed on a processing unit.

16. A computer-readable digital storage medium comprising a computer program product comprising computer-executable components adapted to, when executed on a processing unit, perform the method according to claim 8.

17. A method implemented by a processing unit, wherein the method includes:

determining orientations and positions of a positioning device for a plurality of positions of the positioning device in a global coordinate system based on data received from a global navigation satellite system (GNSS) receiving unit and an inertial measurement unit (IMU);

receiving a pointing input indicative of a position of a point of interest relative to the positioning device for at least one reference position of the positioning device; and determining a geospatial position of the point of interest in the global coordinate system based on the determined orientations and positions of the positioning device in the global coordinate system and the received pointing input.

18. The method of claim 17 wherein the processing unit is configured on a server within an internet cloud infrastructure.

19. A computer program product comprising computer-executable components for performing a method according to claim 17 when the computer-executable components are executed on a processing unit.

20. A computer-readable digital storage medium comprising a computer program product comprising computer-executable components adapted to, when executed on a processing unit, perform the method according to claim 17.

* * * * *